Patented Aug. 26, 1947

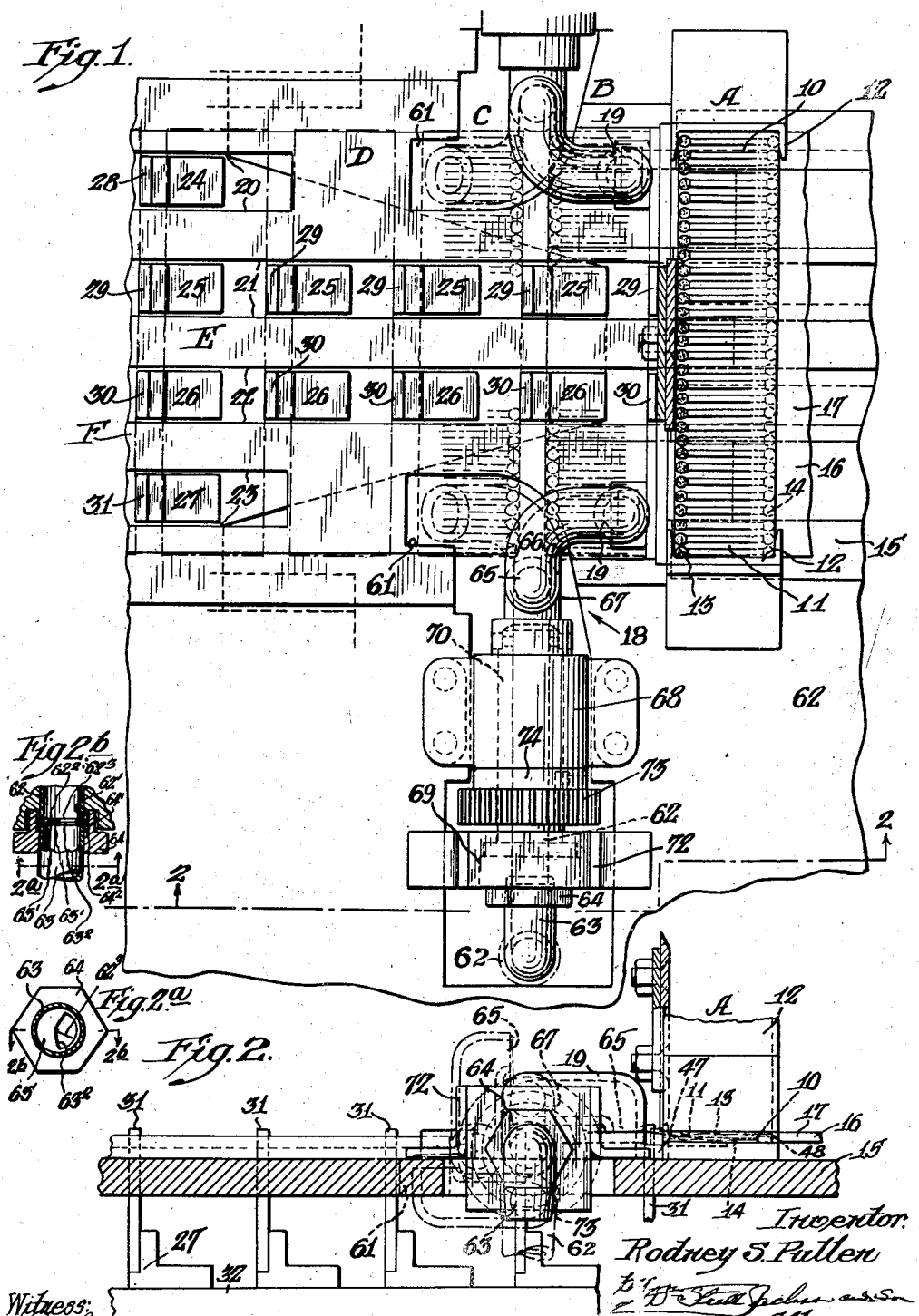

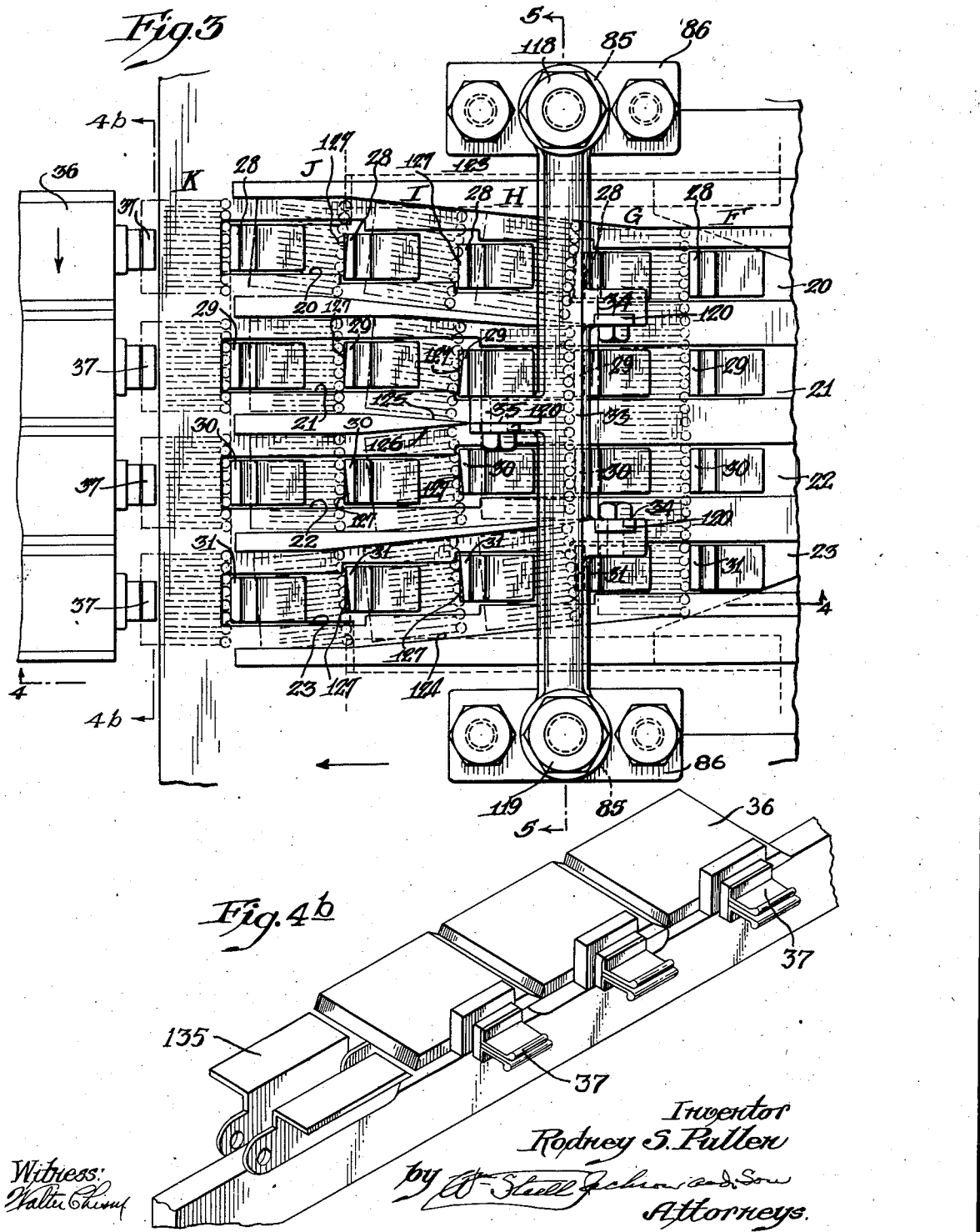

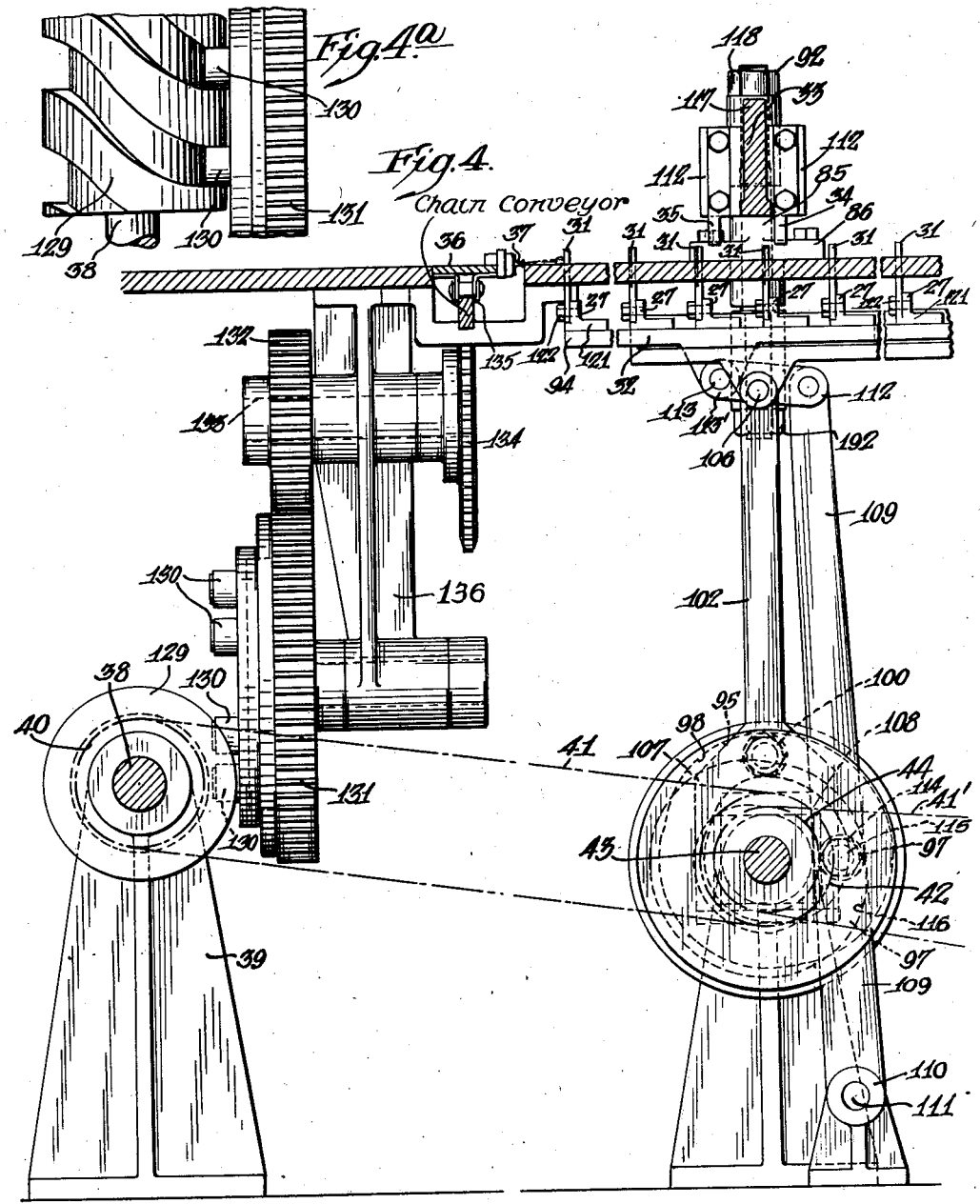

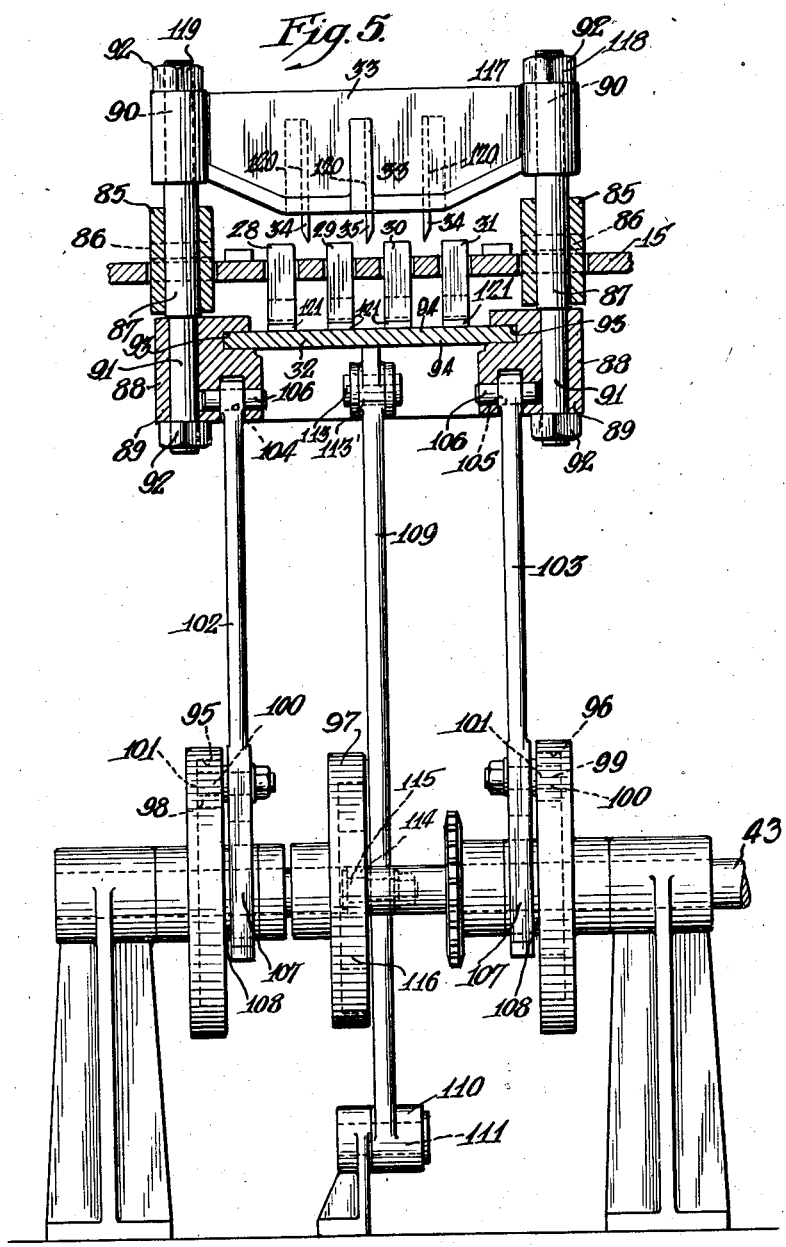

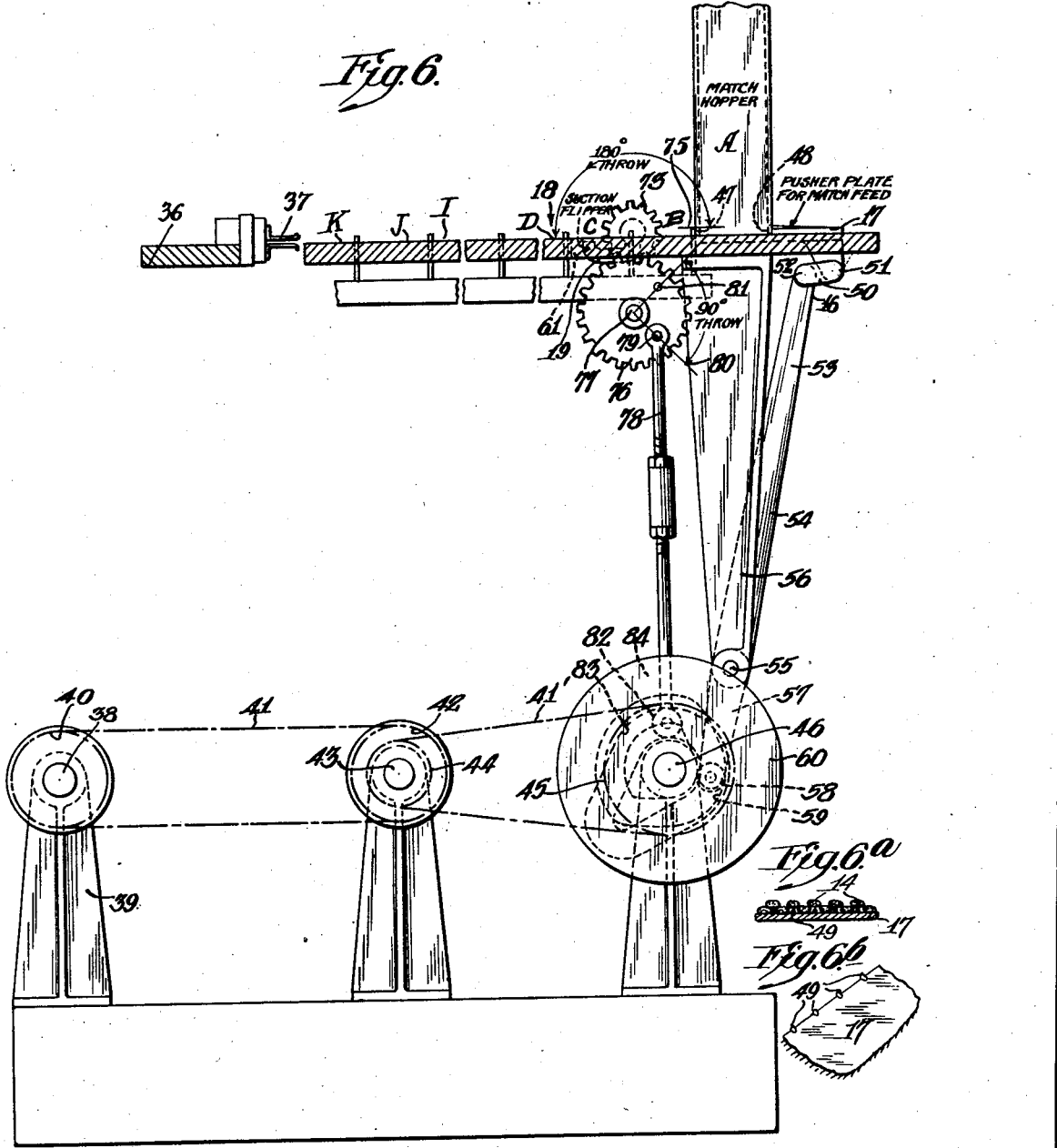

2,426,414

UNITED STATES PATENT OFFICE 2,426,414

CONVEYOR FOR HANDLING MATCH COMBS

Rodney S. Pullen, Akron, Ohio, assignor to Pullenlite Company, Philadelphia, Pa., a corporation of Pennsylvania Application July 1, 1943, Serial No. 493,118

2 Claims. (Cl. 144—51)

1

My invention relates to mechanism for handling match combs from a hopper, in which the full combs are stored, intermediately, to a conveyor by which the separated book match comb sections are fed to other mechanism.

One of the purposes of the invention is to cut and separate match comb sections, spacing them and feeding them to conveyor gripping mechanism.

A further purpose is to separate match combs into spaced match sections, to feed these match sections parallel with the lengths of the matches, a group of sections at a time, to place the sections of the group in spaced grouping mechanisms in a conveyor moving laterally with respect to the first conveyor and to hold the match sections by this transverse conveyor for further operations.

A further purpose is to cut match combs up into match sections, to divide the match sections and space them laterally, so as to yield a uniform spacing between the sections, and to transfer the match sections to spaced gripping mechanisms carried in groups by a transverse conveyor.

Further purposes appear in the specification and in the claims.

Figure 1 is a top plan view of a hopper containing match combs, and of fragmentary mechanism for feeding the combs. Further mechanism is shown in Figure 3.

Figure 2 is a section of Figure 1 taken upon line 2—2 and looking in the direction of the arrow.

Figure 2ª is a section upon line 2ª—2ª of Figure 2ᵇ.

Figure 2ᵇ is a section upon line 2ᵇ—2ᵇ of Figure 2ª.

Figure 3 is a fragmentary top plan view of a further portion of the mechanism seen in Figure 1, showing mechanism operating concurrently with the operation of the parts in Figure 1 but upon stock which already has been acted upon by the structure of Figure 1.

Figure 4 is a vertical section parallel to the direction of match movement showing operating mechanism for cutting the match combs and conveying the match comb sections.

Figure 4ª is a fragmentary top plan view of a part of Figure 4.

Figure 4ᵇ is a fragmentary perspective of a portion of the chain conveyor from the clip side, corresponding to the line 4ᵇ—4ᵇ of Figure 3.

Figure 5 is a section of the mechanism seen in Figure 3 taken upon line 5—5.

Figure 6 is a diagrammatic view of driving connections for the plunger and flipper operation.

Figure 6ª is a fragmentary cross-section showing the plunger of Figure 6.

Figure 6ᵇ is a fragmentary perspective of part of the plunger of Figure 6.

2

In the drawings similar numerals indicate like parts.

In the making of match packets the well-known match combs are cut into match comb sections, each of which provides the matches for one packet. Initially the matches for a section are attached at their stick ends to stubs and are handled by the stubs.

My present invention is directed to the handling of match combs to cut them up into sections, to separate the sections a distance so that they can be operated upon, and to mount the sections so spaced by supporting the stubs of the sections upon a conveyor chain for handling at other points during the making of the packets. Though I indicate a four packet comb, and show mechanism adapted to such a comb, it is my intention to deal with, cut separate and mount combs of whatever length, whatever the number of matches involved and whatever the number of packet sections.

The match combs 10 are stored in pairs 11, one pair above another in a hopper 12, each pair including combs 13 and 14 having their stick ends reversely turned, those in the lower comb of the pair pointing forwardly, in the correct direction.

The hopper rests at position A above a table 15 upon which the combs are ejected to position B by a plunger unit 16 including a plunger 17 and operating mechanism seen in Figure 6. From this position the upper combs are flipped a half turn each about a transverse axis and are also transferred from conveyor position B to conveyor position C, by a unit 18 (Figures 1 and 6) including flipper 19.

The table is slotted longitudinally throughout most of its working length at 20, 21, 22 and 23 to permit operation in these slots of a plurality of conveyor flights 24, 25, 26 and 27 carrying pusher conveyor blades 28, 29, 30 and 31 and, along with the cradle conveyor operating mechanism for it, (Figures 2, 4 and 5) forming a pusher conveyor unit 32 (see bottom of Figure 2).

At a suitable position to the left of the flipper unit is located a cutting unit 33 comprising cutting knives 34 to cut off the side sections at one position along the length of travel of the combs and knives 35 to cut the center at another position further along, as well as the operating mechanism for these knives.

At the left end of Figure 3 and at the left in Figure 4 is shown a transverse conveyor, indicated as of chain type, having successive groups of chains and corresponding comb-section-supporting devices 36 including spring clips 37.

All of the mechanism is illustrated as being driven from a main shaft 38 mounted upon a standard 39 and communicating by pulley 40 and belt 41 with a pulley 42 upon an intermediate or counter shaft 43. Upon the counter shaft is mounted a pulley 44 connected by belt 41' with a pulley 45 mounted upon a third shaft (second countershaft) 46. Any suitable motor or belt drive (not shown) may be applied to shaft 38.

A plunger 17 is guided to move through openings 47, 48 in the front and back of the lower part of the hopper. It is important that the pusher eject a pair of combs (an upper comb and a lower comb of the same pair, together) each time and this is ensured by providing prongs 49 (Figure 6b) at intervals along the upper pusher edge, which fit into the spaces between the matches of the lower comb pair and the heads of the lower comb in the next upper pair of combs.

The plunger is thrown to the left and back again by a link 50, engaging pivotally with the plunger at 51 at one end and at the other end at 52 with the longer end 53 of a lever 54. The lever is pivoted at 55 in a bracket 56 carried by the bed.

The lever extends beyond the pivot 55 at 57 and terminates in a roller 58 which lies within a cam slot 59 opening from the face opposite to the observer in Figure 6 of an internal cam wheel 60 driven by the second counter-shaft 46.

The lever extension 57 (the shorter arm of lever 53) is of such proportion and the internal cam slot is of such throw and angular location with respect to the conveyor movements that the plunger operates at every other conveyor stage of movement, after the conveyor starts to move. This is secured by the angular timing of the cam slot and by rotation of the cam wheel 60 but once for each two stages of movement of the conveyor.

Each lower comb of a pair is shifted from position A to position B before another pair of combs can be ejected. A second set of flight conveyor blades follows the ejected pair into position to be ready to transfer the lower comb of each pair to position C in the next (second) conveyor stage movement.

At the same time that the first stage of flight conveyor movement is shifting the flight conveyor blades which had been back of position B to a position where they are back of position C, other flight blades have transferred a comb from position C to position D. This clears position C.

That position C shall be clear at this time is necessary for two reasons; (1) so that the flippers can emerge from their dotted position in Figure 1 to make a clockwise half turn and come back again and (2) so that on the back stroke of the flippers there will be an empty position C upon which to rest the comb which is flipped.

It will be clear that the flippers engage, advance and turn over end for end the upper comb only of each pair so that the combs are then arranged with the match stick ends forward in all positions throughout the conveyor length.

The flipper movement must take place during the interval between the first conveyor flight movement and the beginning of the second conveyor flight movement, for the reason that the position C is not vacant for operation of the flipper until after the first conveyor flight movement, and the second conveyor flight movement, if it began, would move the comb pair (or the lower one of the combs if the flipper had raised the upper one) from position B so as to interfere with the flipper deposit of the upper one of the combs upon position C.

There are two flippers, one extending into the bed position from one side and the other from the other side. Except for the differences necessary because of the direction of extension they are identical. For this reason the one nearer to the observer in Figure 1 only will be described.

The flipper normally lies in the position seen in Figure 1 in dotted lines with the nozzle mouth below the surface of the bed and from that position turns in clockwise direction 180° and back again through an opening 61 in the table.

The flipper supply pipe tube 62 is mounted in bearings 68 and 69, preferably using filler 70 as the inner bearing member, and preventing longitudinal pipe movement by a flange 72 upon a filler engaging one bearing.

Each flipper includes an oscillatory supply pipe tube 62, terminating in an externally threaded flange 62' and a transverse closure plate 62² having an opening in half of the plate, performing air valve functions (see Figures 2a and 2b). The pipe connects with a nipple 63 (Figure 2) from which vacuum connection is made. The nipple end also carries valve plate 63' having opening 63² in half of the plate.

The two openings 62³ and 63² register in the position of Figure 1 to apply vacuum or to cut off air suction according to the position of the flipper, seen at the left in dotted lines in Figure 1. Vacuum connection is applied at intermediate positions. Flange 63' upon the outer circumference at the end of the nipple is engaged by interior flange 64' within nut 64. Internally threaded sleeve 64² on this nut engages threaded flange 62' to hold the parts together.

At the opposite end of the oscillatory pipe from the nipple is located an off-center open mouthed flipper nozzle 65. The nozzle is connected with the tube through an elbow 66 and an off-center nearly radial tube section 67.

A gear wheel 73 is mounted to rotate with the pipe. Its hub 74 can be used to limit suction pipe movement by engagement with the bearings. The flipper nozzle mouth normally lies a little below the table and oscillates between that position and the position shown by line 75 representing the height of the pair of combs ejected (see Figure 6). Suitable valve mechanism operates during counterclockwise movement of the flipper from a position at which the flipper's mouth engages the top comb until the flipper deposits this upper comb at position C. This valve construction is not intended to be claimed by me in this case. A sleeve valve opened by movement of the flipper or separate valve mechanism might be used.

Gear 73 is turned by gear 76 upon bearing 77, and is rocked by thrust rod 78 turning about a pin 79. A quadrant stroke is provided, between pin position 80 and pin position 81. Since gear 76 is twice the diameter of gear 73, gear 73 is thus oscillated through 180° of turning movement.

Thrust rod 78 carries wheel 82 which fits into face cam 83 of cam wheel 84 carried by shaft 46. Cam wheel 84 rotates of course at the same speed as cam wheel 60, i. e. one turn for every two stages of flight conveyor as above.

The angular position and extent of the internal cam used to operate thrust rod 78 and the position of this thrust rod must be such that the thrust rod suitably guided will lift and lower to give a complete oscillation of the flipper immediately after the new pair of match combs is ejected, so as to engage the top of the pair with suction in the extreme clockwise position of the flipper and to return the flipper to its normal position, still with suction "on," depositing the upper match comb at position C (releasing the suction) in time for this upper match comb to be transferred from position C to position D at the next (second) stage of movement of the conveyor flights.

Figures 1 and 3 are intended to provide positions and operating mechanism for handling the match combs and the sections cut from them from the hopper to their final delivery between spring clamping clips carried by the links of the chain conveyor.

Figure 1 includes the hopper (position A); the ejecting mechanism delivering to position B; the flipping mechanism turning between positions B and C at which latter the flipped combs are delivered at the end of the return flipper stroke; and positions D and E and a part of position F.

Though the flipping is over at position C and it will be possible to begin cutting at position D, so far as the actual freedom from interference of mechanisms is concerned, non-active positions are provided, such as D, E and F which may vary in number according to the length of space desired, in which there is opportunity for placing combs if any of the combs fail to be fed by the plunger and flipper in the preceding positions. This avoids gaps in comb sections fed to the clips carried by links in the chain conveyor.

The combs which have been fed from the hopper are fed through these relatively idle spaces or positions but no operation is intended to be performed upon them.

In Figure 3 the first position is shown. It is or may be an idler position, such as F, seen in part in Figure 1, but the first action takes place in position G and further operating positions are shown at H, I, J and K.

Since the flight conveyor is used to carry the match combs and, after they have been cut off, the match comb sections, this conveyor will be described next.

There are four conveyor flights, two acting from the hopper to the chain conveyor and two acting from some such position as F to the chain conveyor. Each of the conveyor flights occupies a separate position laterally of the table and moves in a corresponding longitudinal slot separate and distinct from each other conveyor flight and slot, except that they are all operated by one common supporting, lifting and oscillating mechanism. Each moves its blades and the combs or comb sections in front of them through one position length and then returns to move succeeding combs or comb sections through the same position length.

The conveyor flights are nearly identical, differing in that the two flights near the middle of the table are extended farther than the two flights adjacent the respective outer edges of the table. There are three reasons for this. One is that the two flights near the middle of the width of the table are sufficient to handle the match combs until after they are cut, and so are used beginning at position B to advance the lower comb of the pair ejected to the left from position B to position C, to advance the combs at C to D, D to E, E to F and F to G. Another reason is that the positions of the flippers interfere with operation of the outside conveyor flights beyond position F or position E. A third reason is that the cutting of the sections from the combs begins at the outer ends of the comb and these outside conveyor flights have their first separate duty when the first cuts have been made, which in Figure 3 is seen to be at position G.

Another feature in which the four flights are not all alike is that though some pusher blades in each of the flights are laterally offset with respect to other pusher blades in the same flights, pusher blades in the outer flights are farther offset within the total lengths than are the pusher blades for the inner flights because the outer flights must take care of not only their own spacing from the inner flights but the ultimate spacing of some of the pusher blades of the inner flights, one flight from the other.

The mechanism by which the flight conveyors are operated in unison is shown in Figures 1, 3, 4 and 5.

Tubular guides 85 for the conveyor driving mechanism are carried by pedestals 86 on opposite sides of the table. Within the guides 85 move vertical rods 87 rigidly connected with the side bars 88 of a cradle 89, in which bars reduced ends 91, 91 of the rods are held by nuts 92. The side bars carry guides 93 for a blade-supporting plate 94.

The cradle is lifted and lowered by mechanism best seen in Figures 4 and 5.

Countershaft 43 carries two lifting face cams 95 and 96 and an intermediate face cam 97 by which oscillation of the plate 94 is secured. The lifting face cams have facing cam grooves 98 and 99 which receive rollers 100 secured by pins 101 upon thrust arms 102, 103. The thrust arms connect at their upper ends through eyes 104, 105 and pins 106 with the side bars 88. At the lower ends these thrust arms are divided to form yokes at 107. These yokes straddle guides 108 rotatable with the shaft, maintaining the lower ends of the thrust arms against movement transversely of the countershaft. The face cams, rollers and thrust rods thus provide vertical movement of the cradle side bars and of the plate 94 guided by them.

The lever arm 109 is pivoted at its lower end at 110 about a fixed pin 111 and at its upper end terminates in ears 112 which turn about pin 113 in eye 113' rigid with the plate. At an intermediate point the lever arm 109 carries roller 114 by pin 115. The roller and its lever are shifted laterally by the walls of a cam groove 116 in a face cam 97 rotatable with the countershaft.

The two face cams 95, 96 with their thrust rods and the face cam 97 with its oscillating arm are timed to produce a composite movement of the plate 94 and of the pusher flight conveyor blades (for all of the flight conveyors) such that the blades travel to the left in Figures 1 and 3 during their match comb and match comb section conveying movement, lower at the extreme left so that the blades drop below the table level, travel to the right in these figures in their inactive return movement, and finally lift at the extreme right so that the blades reach above the table and are in position to carry match combs and match comb sections with them on their next conveying movement to the left. The composite movements of all of the blades of all of the flight conveyors are therefore the same and are timed the same so that when the lower match comb of the ejected pair is being moved from position B to position C, match combs or later match comb sections are being moved by other blades from position C to position D and from position D to position E, etc., throughout the length of the table, the final blades at the left of figures forcing the match combs between spring finger clips attached to and carried by links of the link belt conveyor.

The upper ends of the rods 87 are extended to carry a beam 117 held to them by nuts 118, 119. The beam supports knives 34—34 intended to operate lengthwise of the bed at position G in the drawing in Figure 3, and a knife 35 intended to operate also longitudinally of the bed at position H in Figure 3. These knives are supported from the beam by brackets 120. The knives lift and lower with the conveyor cradle and hence perform their cutting functions at the same time that the flight conveyor blades drop below the surface of the table ready for their return movement to the right in Figures 1 and 3. They therefore cut after the flight conveyor blades have carried match combs or match comb sections to the respective positions G and H and while the combs at position G and comb sections at position H are resting free from movement.

The conveyor blades 28—31 are supported from the plate 94 by brackets 121 to which they are held by means of bolts 122.

The cutting knives have each a length along the length of the bed just sufficient reliably to cut the stubs of the match comb material to separate parts of the comb into comb sections, at position G, to cut off the outer comb sections from the two as yet integral intermediate comb sections, which in turn are divided at position H.

In Figure 1 the entire lengths of the table slot portions seen are straight, that is parallel with the length of the table and without offsetting. The two flights 25 and 26 only are extended to engage combs at position B and these flights are the only ones whose blades transfer from position B to position C, and C to D, from D to E and from E to F.

At position F the blades of flights 24 and 27 come into operation, preliminary to the separation of the outside sections of the match combs from the intermediate sections. Until this separation takes place at position G the intermediate flights 25 and 26 are sufficient to handle the match combs. Since the slots for the outside flights are not cut through beyond position E, the table can be supported additionally to the right of position F by a generally triangular frame reinforcement 121 which stops at the slots 21 and 22.

The movement of the flight conveyors and the coincident movements of the cutting knives set the time of the entire mechanism. Though the slots and conveyor blade positions are in line up to position G, where the first cuts take place, from position G on the comb sections are diverted laterally as well as conveyed lengthwise of the table; and the flight conveyor blades contribute to the diversion or separation of these comb sections. This is readily accommodated because the conveyor blades move only the length of one position and then reverse their direction. This affects flights 24 and 27 from G to H and to all of the flights from H to I, and I to J and from J to K.

The diversion beginning at position G after the cuts made at that point are effected, by a combination of guides, offsetting and sloping pusher faces. The diagonal guiding members 123 and 124 extend between slots 20 and 21 and between slots 22 and 23 from the left ends of position G to the right ends of position J, respectively beyond which, with the construction shown, they are not needed, and diagonal guide faces 125 and 126, are effective between slots 21 and 22 from the left end of position H to position J.

The transfer blades are offset successively in the outer flights at positions H, I and J with respect to the placing of these parts in position B to G, and in the inner flights they are offset at I only. There is a corresponding offsetting of the slots within which these blades travel.

Since the outside sections only have been severed at position G, from this position to position H these are the only sections which are diverted and the blades which transfer from position G to position H, therefore divert only as to blades 28 and 31 of flights 24 and 27. However at position H, where the cut takes place between the two intermediate match comb sections, these intermediate sections are also diverged and because of their divergence the outer sections must be further diverged to make room for them. For this reason all of the blades 28, 29, 30 and 31 are offset for transfer from position I to position J and the blades 28 and 31 are offset for transfer also from position J to position K.

The diagonal guides 123 and 124 as well as the diagonal guide faces 125 and 126 are assisted in their guiding function by diagonal front faces 127 of the blades 28 and 31 at position G for transfer from position G to position H; and as to all the blades from position H to I and position J to position K.

The diversion of the sections separates them to the intended extent during their transfer from position to position until as they rest at position J they are separated each from its adjoining sections by the distance desired in operating upon them subsequently; and with this spacing the final conveyor blades transfer the sections from position J to position K, at which their respective stubs are pushed between the springs of clips 37 carried by the successive links of the chain conveyor unit 36.

The construction by which the chain conveyor is advanced is shown at the left in Figure 4. Upon the main shaft 38 is mounted a worm 129 which engages successively with rollers 130 upon a gear 131. The worm and roller spacing ensures that the worm is always pressing against at least one roller.

Gear 131 meshes with a gear 132 mounted upon a shaft 133 which carries also a sprocket or gear wheel 134 by which chain 135 of the chain conveyor is driven. This chain conveyor carries spring clips 37, one for each link. The gears 131 and 132 are supported from a bracket 136 and the worm (cam) and gear connection (ratio) is such that the rollers upon gear 131 are advanced one roller for every conveyor position feed; but this distance is multiplied because of the ratio of gear 131 to gear 132 so that for each one position advance of the first (flight) conveyors (carrying four sections) the transverse (chain) conveyor advances four clips at a time. These receive the four sections of comb and, with the next step-by-step conveyor advance, pass on while four other clips take their places. In other words, four chain conveyor links with their spring clips are advanced at a time and are maintained in position to receive four match comb sections for each feed of the flight conveyors.

The chain conveyor advances the clip-supported match sections, in groups of four to successive positions perpendicular to the paper in Figure 4 and holds the sections while they are acted upon to apply wraps and covers and thus to form packets. The movements of the chain conveyor take place during times when the flight conveyors are not moving the sections and permissibly while the flight conveyor blades are depressed beneath the table for their idle return movements.

The combs are advanced step-by-step by the flight conveyor and at suitable stops the sections intended for match packets are cut apart and the match packets are separated to a distance corresponding to that at which they are to be acted upon in further operations.

In the mechanism shown, in which the full comb is divided into four quarter comb sections, it has been convenient to cut the outside sections off first, in position G, and to separate the two inside sections from each other later as at position H.

After the separation of the outside sections at position G the conveyor flights perform a combined function upon these sections, namely pushing them forward and at the same time guiding them diagonally to a proper spacing from the as yet unsevered middle portion of the comb. The two inner sections are then separated and the flights of the conveyor push them forward and at the same time divert them to give their proper spacing. Concurrently the outside sections are further diverted to maintain proper spacing between them and the now diverging inner sections.

When the four sections have been properly spaced and positioned they are pushed sticks first into the four clips of the (transverse) chain conveyor.

Since each step-by-step movement of the four flight conveyors place four match sections to the chain conveyor, the chain conveyor match receiving clips advance in units of four clips at a time to receive them, carrying them off to the left in the figures in time for four new clips to replace the four just filled so as to receive the next group of four sections fed by the flight conveyor.

There is but one central cutting knife which is located at position H in the illustration and there are two side cutting knives which are at position G. During the progress of the combs they reach position G before they reach position H and, as to any individual combs, are acted upon first by the two side cutting knives, one near one side of the comb and the other near the other side of the comb.

After these side cutting knives act, the as yet uncut central part of the comb continues to advance to position H and is there cut into two parts, the cutting of this comb being concurrent with the making of the side cuts in the next following comb. Since the cutting knives are located at all times opposite these table positions, they cannot cut in any other than the order indicated.

In operation the combs are ejected in pairs, one comb having the match heads forwardly directed and the other comb having the match sticks forwardly directed. The flippers lift the upper comb of the pair and advance it, at the same time reversing the match stick direction so that the sticks are now directed forwardly in all of the positions. The conveyors now engage and advance the combs from each position at which they engage to the next position forward, there being opportunity in some of the positions to correct a failure to feed by supplying another match comb. The combs are advanced as units up to the position G where the first cutting operation is performed, cutting from the combs the end match sections which are subsequently diverted from the uncut two central match sections remaining. At the next comb position these central sections are separated and subsequently are guided apart at the same time that the side sections are further guided apart so as to equally space the four match packet sections of the comb, one section from its adjoining section. As a result, the four match packet sections are presented, match sticks forward, for engagement by clips of the chain conveyor, the clips being carried by successive conveyor links, so that the conveyor must move forward four links lengthwise of the conveyor before another group of match packet sections can be picked up by the chain conveyor.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my claims.

Having thus described my invention what I claim as new and desire to secure by Letters Patent is:

1. In a match comb handling system, means for conveying, cutting and spacing the match combs to divide them into laterally spaced match comb sections, a chain conveyor movable laterally of the matches in the sections and generally parallel to the flat backs of the sections having a plurality of successive chain conveyor links operating in a group, clip holders for match comb sections carried by the successive links of the group, said conveyor means pressing match comb sections into the successive clip holders, and chain conveyor operating means timed to advance the chain conveyor one group of links corresponding in number of links to the number of spaced match comb sections, for each step-by-step movement of the conveying means.

2. In match comb handling mechanism, a chain conveyor having a succession of links in groups corresponding in number of links to the number of match sections in a match comb, open-ended engaging clips carried by the successive links, gear connections for advancing the links transversely of the matches in the comb section and generally parallel to the backs of the comb sections, a group at a time, including meshing gears, teeth adapted to be revolved to turn the gears, a cam engaging the teeth and maintained always in contact with one of the teeth whereby the gears are advanced, one group of chain gear links at a time, the number of links lengthwise of the chain conveyor in the group corresponding with the number of match sections in a comb and conveyor means for concurrently feeding match comb sections, one to each of the engaging clips, upon a group of chain conveyor links.

RODNEY S. PULLEN.

REFERENCES CITED

The following references are of record in the file of this patent:

UNITED STATES PATENTS

| Number | Name | Date |
| --- | --- | --- |
| 920,513 | Young | May 4, 1909 |
| 1,266,815 | Kelley | May 21, 1918 |
| 1,962,788 | Schafer | June 12, 1934 |
| 1,924,264 | Van Hoffstadt | Aug. 29, 1933 |
| 1,971,992 | Schafer | Aug. 28, 1934 |